(12) United States Patent
Mack et al.

(10) Patent No.: US 10,173,354 B2
(45) Date of Patent: Jan. 8, 2019

(54) VACUUM INSULATING PANEL (71) Applicant: Kingspan Holdings (IRL) Limited, Co. Cavan (IE)

(72) Inventors: Daniel Mack, Hereford (GB); Adrian Pargeter, West Midlands (GB); Malcolm Rochefort, Ludlow (GB)

(73) Assignee: Kingspan Holdings (IRL) Limited, Kingscourt, County Cavan (IE)

( * ) Notice: Subject to any disclaimer, the term of this patent is extended or adjusted under 35 U.S.C. 154(b) by 0 days.

(21) Appl. No.: 15/543,396

(22) PCT Filed: Jan. 15, 2016

(86) PCT No.: PCT/EP2016/050845
§ 371 (c)(1),
(2) Date: Jul. 13, 2017

(87) PCT Pub. No.: WO2016/113423
PCT Pub. Date: Jul. 21, 2016

(65) Prior Publication Data
US 2017/0368724 A1 Dec. 28, 2017

(30) Foreign Application Priority Data
Jan. 15, 2015 (GB) .................... 1500679.4

(51) Int. Cl.
*F16L 59/065* (2006.01)
*B29C 43/18* (2006.01)
(Continued)

(52) U.S. Cl.
CPC ................ *B29C 43/18* (2013.01); *B32B 3/04* (2013.01); *B32B 3/06* (2013.01); *B32B 3/266* (2013.01); *B32B 5/02* (2013.01); *B32B 5/16* (2013.01); *B32B 5/18* (2013.01); *B32B 5/30* (2013.01); *B32B 27/065* (2013.01); *B32B 27/14* (2013.01); *B32B 37/1018* (2013.01); *F16L 59/029* (2013.01); *F16L 59/065* (2013.01); *F25D 23/06* (2013.01); *B29K 2105/04* (2013.01); *B29K 2275/00* (2013.01); *B29K 2995/0015* (2013.01);
(Continued)

(58) Field of Classification Search
CPC .... Y10T 428/231; F16L 59/065; Y02B 80/12; E04B 1/803; F25D 2201/14
See application file for complete search history.

(56) References Cited

U.S. PATENT DOCUMENTS

2012/0297813 A1  11/2012  Hanley et al.

FOREIGN PATENT DOCUMENTS

EP  1 291 300 A2  3/2003
EP  2 607 073 A2  6/2013
(Continued)

*Primary Examiner* — Alexander S Thomas
(74) *Attorney, Agent, or Firm* — Harness, Dickey & Pierce, P.L.C.

(57) ABSTRACT

The present invention relates to a vacuum insulating panel (VIP). The VIP comprises an insulating core (2) having upper (3) and lower surfaces (4) and at least one substantially planar reinforcing member (5) arranged on the upper (3) or lower surface (4) of the core (2). The reinforcing member (5) is porous and substantially rigid. The VIP further comprises a barrier envelope, optionally in the form of a barrier film (6), arranged to envelop the insulating core (2) and the planar member (5). The present invention also relates to methods of manufacturing a vacuum insulating panel (VIP).

22 Claims, 6 Drawing Sheets

(51) Int. Cl.
    *F25D 23/06*     (2006.01)
    *F16L 59/02*     (2006.01)
    *B32B 5/02*     (2006.01)
    *B32B 5/16*     (2006.01)
    *B32B 5/18*     (2006.01)
    *B32B 5/30*     (2006.01)
    *B32B 27/06*     (2006.01)
    *B32B 27/14*     (2006.01)
    *B32B 3/04*     (2006.01)
    *B32B 3/06*     (2006.01)
    *B32B 3/26*     (2006.01)
    *B32B 37/10*     (2006.01)
    *B29K 105/04*     (2006.01)
    *B29K 275/00*     (2006.01)
    *B29L 7/00*     (2006.01)

(52) U.S. Cl.
    CPC . *B29L 2007/002* (2013.01); *B32B 2262/0253* (2013.01); *B32B 2262/0276* (2013.01); *B32B 2264/102* (2013.01); *B32B 2264/12* (2013.01); *B32B 2266/025* (2013.01); *B32B 2266/0264* (2013.01); *B32B 2266/0278* (2013.01); *B32B 2266/0285* (2013.01); *B32B 2266/06* (2013.01); *B32B 2307/302* (2013.01); *B32B 2307/304* (2013.01); *B32B 2307/72* (2013.01); *B32B 2307/7242* (2013.01); *B32B 2307/732* (2013.01); *B32B 2419/02* (2013.01); *B32B 2607/00* (2013.01); *F25D 2201/14* (2013.01); *Y10T 428/231* (2015.01)

(56) References Cited

FOREIGN PATENT DOCUMENTS

| | | |
|---|---|---|
| GB | 2 336 565 | 10/1999 |
| JP | H08-178176 | 7/1996 |
| JP | 2002-310384 | 10/2002 |
| JP | 2006-029686 | 2/2006 |

VACUUM INSULATING PANEL

CROSS REFERENCE TO RELATED APPLICATIONS

This application is a U.S. National Phase Application under 35 U.S.C. 371 of International Application No. PCT/EP2016/050845 filed on Jan. 15, 2016. This application claims priority to Great Britian Application No, 1500679.4 filed on Jan. 15, 2015. The entire disclosures of all of the above applications are incorporated herein by reference.

FIELD OF THE INVENTION

The present invention relates to vacuum insulating panels (VIPs), and in particular, to VIPs having a hybrid or multi-layer core.

BACKGROUND TO THE INVENTION

Current VIP technology used in refrigeration units and the like generally comprises a single panel of insulation material formed typically of fumed silica, mineral fibre or other microporous material core, which may or may not contain infra-red opacifiers, the core wrapped in a flexible, gas-tight envelope to which a vacuum is applied before sealing.

Thermal conductivity properties of VIPs are typically of the order of about 0.005 W/mK. All thermal conductivity values referenced herein are those determined under BS EN: 12667:2001 unless expressly indicated otherwise. mW/mK are the units for thermal conductivity and are milliwatts per meter Kelvin.

EP2607073 describes a VIP comprising a composite core material formed of glass fiber wool and glass fiber board and an outer skin material having a layered structure comprising a surface protective layer, a metal barrier layer, and a bonding layer from the outside to vacuum-package the core material. The object of EP2607073 is to provide a VIP which exhibits a long-term durability of 10 years or more. However, despite starting from an initial thermal conductivity of approximately 2.4 mW/mK, the predicted thermal conductivity after 2 years was approximately 6.4 mW/mK. By incorporating a glass fiber board, although the initial thermal conductivity is satisfactory, the lifetime of the board decreases rapidly over time.

JP2002310384 describes a VIP comprising a glass fibre insulating core and reinforcing members which are laminated to the insulating core. The reinforcing members are for example made of stainless steel or polyethylene terephthalate. The presence of the insulating core improves the physical appearance of the VIP but its incorporation leads to a decrease in thermal performance, as its inclusion results in an increase in thermal conductivity of the VIP.

JP2006029686 describes a VIP comprising an insulating core accommodated in a gas barrier container. The container comprises a multilayer resin film comprising an aluminum vapour deposition film and a reinforcement layer comprising ethylene vinyl alcohol copolymer and inorganic-type material.

JPH08178176 describes a VIP comprising an insulating core contained in a breathable bag which is housed between reinforcing plates which prevent bending or twisting of the VIP.

Notwithstanding the state of the art, there remains a long felt, yet unmet need to provide VIPs with improved thermal conductivity and a long-term durable lifetime.

It is known that the thermal conductivity of a VIP product may be improved by reducing the density of the core, which has the added benefit of reducing the production cost of the VIP. However, a reduced density core is less robust and more prone to breakage and thus is more difficult to handle during the various production stages.

Thus, while it is desirable to reduce the density of the core as much as possible in order to improve thermal performance, the more the density is reduced, the more compromised are the handling properties of the core and any VIP made from it.

For example, conventional VIPs made from powder insulation cores with core density values of lower than about 165 $kg/m^3$ have poor dimensional stability, the edges of the panels collapse and the panel envelope wrinkles. The result is an inferior product, which tends to warp over time and has an aesthetically displeasing appearance. A balance must therefore be struck between thermal performance and dimensional integrity on the one hand and ease of handling, on the other hand.

SUMMARY OF THE INVENTION

The present invention provides a vacuum insulating panel comprising:

a porous insulating core having an upper surface and a lower surface and sides;

at least one reinforcing member arranged on the upper or lower surface of the insulating core to reinforce the core, wherein the reinforcing member is formed of a porous material, and is substantially rigid;

wherein together the at least one reinforcing member and the insulating core form a hybrid core and the reinforcing member(s) does not form a thermal bridge across the insulating core; and an envelope, arranged to envelop the hybrid core, and to maintain an applied vacuum within the envelope.

The VIPs of the invention have good dimensional stability, the edges of the panels do not collapse and the panel envelope does not wrinkle. The result is a superior product, which does not warp over time. As a result VIPs of the invention have aesthetically pleasing appearance.

The insulating core is typically based on a particulate material such as a powder material that is formed into a core for example by pressing, sintering, etc. The material forming the core may comprise one or more other components, to form a core. Typically the core will be planar in nature. Often it will have rectangular faces such as in a cuboid. Such faces will be dimensionally stable. Typically it will be thin relative to its length and width. Typical dimensions of the insulating core are: 300 mm×300 mm×10 mm (length× width×thickness) to 1200 mm×600 mm×80 mm (length× width×thickness).

Desirably the reinforcing member is planar. The reinforcing member will have substantially the same length and width dimensions as the insulating core. A reinforcing member will thus typically reinforce the insulating core across all of one surface thereof. Typical dimensions of a reinforcing member are: {300 mm to 1200 mm} (length)× {300 to 600 mm} (width)×{1 mm to 5 mm} (thickness).

In the present invention the reinforcing member will typically have a higher thermal conductivity than the insulating core. For that reason a vacuum insulation panel of the invention will be formed so that there is no thermal bridge that allows heat to be conducted through the hybrid core by bypassing the insulating core. The insulating core does not from a thermal bridge between the upper and lower surfaces.

In particular there will be no thermal bridge formed by the material of which the reinforcing member(s) is constructed. For example, material forming the reinforcing member(s) will not extend about the sides of the insulating core. Instead, the reinforcing member(s) will be located only on the upper and/or lower surface of the insulating core. It will not bridge across the insulating core.

This means that any diminution in the overall thermal conductivity performance of the vacuum insulation panel which results from using the reinforcing member(s) is minimised. Furthermore, because of the incorporation of the reinforcing member, the density of the insulating can be reduced and a vacuum insulation panel is provided with improved thermal performance in comparison to conventional vacuum insulation panels.

The present inventors have thus discovered that it is possible to have a construction where the overall thermal performance of the vacuum insulation panel is improved despite the use of materials for the reinforcing member(s) that have inferior thermal conductivity properties than the insulating core.

In particular, the inventors have discovered that it is possible to reduce the density of the insulating core to an extent that it requires reinforcement for the purposes of handling, yet the thermal conductivity of the insulating core thus achieved by using the reduced density insulating core, more than offsets the poorer thermal conductivity performance achieved using the reinforcing member(s). The net effect is thus an increased thermal insulation performance of the VIP. The overall thermal performance of the lower thermal conductivity of the reduced density core when combined with the higher thermal conductivity of the reinforcing member(s) is still better than that of a higher density core that does not require a reinforcing member. Yet the hybrid core is suitably robust for handling purposes. It is dimensionally stable particularly when the envelope is subjected to a vacuum, and during subsequent handling.

A reduced density insulation core can be used in the present invention. In particular a reduced density insulation core is one which has been reduced in density so as not to be dimensionally stable. For example an insulating core having a density of from about 100 kg/m$^3$ to about 165 kg/m$^3$ or from about 120 kg/m$^3$ to about 165 kg/m$^3$ or from about 110 kg/m$^3$ to about 135 kg/m$^3$ within a VIP. Even though it is a reduced density core the hybrid core has the desired dimensional stability.

Conventional VIPs comprising an insulating core made of a microporous insulating material formed of a powder material, have demonstrated thermal conductivities of about 4 mW/mK to 4.5 mW/mK.

Conventional VIPs comprising an insulating core made of substantially open celled foam (such as microporous polyurethane) have demonstrated thermal conductivities of about 8 mW/mK.

VIPs of the present invention comprise a hybrid core comprising an insulating core made from a microporous insulating material formed of a powder material and a porous reinforcing member made of a substantially open celled foam, for example a foam having an open cell content of greater than about 90%. The resulting VIP has an improved thermal conductivity of from about 3 to about 4 mW/mK despite the inclusion of the reinforcing member which has an inferior thermal conductivity in comparison to the insulating core. The presence of the reinforcing member, enables use of an insulating core made of a microporous insulating material formed of a powder material and having a reduced density in comparison to conventional VIPs made of a microporous insulating material formed of a powder material.

Specifically, traditional VIPs comprising insulating cores formed of fumed silica had densities of from about 170 kg/m$^3$ to about 200 kg/m$^3$, whereas VIPs of the present invention comprising a reinforcing member have insulating cores formed of fumed silica with a density of from about 110 kg/m$^3$ to about 160 kg/m$^3$. The result is a VIP having improved thermal performance.

Heretofore a VIP comprising a hybrid core and having overall improved thermal conductivity of the hybrid core has not been described.

Advantageously, use of the at least one reinforcing porous member to reinforce the insulating core, enables the manufacture of a reduced density hybrid core, comprising a reduced density insulating core. In the absence of the at least one reinforcing member, the reduced density insulating core by itself does not have sufficient handling strength to be formed into a VIP. In the absence of the at least one reinforcing member the structural integrity of a VIP formed from such a reduced density insulating core is poor. For example VIPs comprising such a reduced density insulating core, in the absence of the at least one reinforcing member, partially collapse, and increased wrinkling is observed in the envelope of said VIPs when vacuum is applied. Furthermore, due to the aforementioned partial collapse of the core, any square sides of a panel are not retained. Loss of structural integrity renders the VIPs unsuitable for close packing, because their sides become irregular and there are significant gaps between VIPs even when they are arranged side by side in abutment.

A conventional VIP has a thermal conductivity (lambda value) of approximately 5.0 mW/mK. In contrast VIPs comprising the hybrid core of the present invention have a thermal conductivity of about 3.0 mW/mK to about 4.0 mW/mK; desirably VIPs of the present invention have a thermal conductivity value of about 3.5 mW/mK or less such as about 3.2 mW/mK or less.

Suitably, the at least one reinforcing member has a substantially smooth outer surface—that is a surface that does not cause any (substantial) perceptible pitting in the envelope. This is particularly important as the reinforcing member is desirably porous as set out above. The porosity of the reinforcing member will extend throughout its mass. It will have surface pores. Desirably the porosity of its surface does not cause any (substantial) perceptible pitting in the envelope. An advantage of this arrangement is that, after the vacuum is applied, the VIP has a smoother outer surface than could otherwise be achieved with a reduced density core as such cores are typically rougher or more undulating than higher density materials. This provides an aesthetic advantage and also allows for better adhesion (of the envelope) in use. In certain embodiments, information such as text, a pattern or logo may be imprinted or embossed on the outer surface of the reinforcing member. The envelope will be sucked against the information on the outer surface of the reinforcing member and will take its shape. The result may be that the information may then be raised (in relief) or depressed (in counter-relief).

In contrast to a VIP of the present invention, the surface of a conventional VIP having a conventional insulating core, after application of a vacuum to the envelope, will have an increased amount of undulation or roughness as the density of the core is reduced. This is because the envelope to which the vacuum is applied gets sucked against the core resulting in an imprint of the core surface being imparted to the envelope. This creates a less aesthetically pleasing VIP.

The VIPs of the present invention have the combined benefits of high thermal performance provided by the reduced density insulating core, in conjunction with improved handling and smoothness provided by the more rigid reinforcing member. Thus the presence of the reinforcing member, which typically has a lower thermal performance than the core, allows the overall thermal performance of the panel to be improved significantly, while overcoming the disadvantages normally associated with reduced density cores.

In the present invention the hybrid core performs better from an insulation viewpoint than a comparable (unreinforced) insulating core which does not require reinforcement for handling purposes.

The VIP of the present invention may comprise a plurality of reinforcing members.

The VIP of the present invention may comprise an upper reinforcing member arranged on the upper surface of the insulating core and having a lower reinforcing member arranged on the lower surface of the insulating core.

Suitably, the at least one of the reinforcing members has a compressive strength of from about 95 kPa to about 150 kPa. The presence of a reinforcing member having a compressive strength of from about 95 kPa to about 150 kPa, facilitates the use of an insulating core of reduced density when compared with traditional VIP insulating cores. Overall the result is a VIP with enhanced thermal performance and an improved aesthetic appearance.

Unless otherwise specified compressive strengths are measured as according to BS EN 826: 2013.

The VIP of the present invention may comprise an upper reinforcing member HI and a lower reinforcing member each reinforcing member having a compressive strength of from about 95 kPa to about 150 kPa.

The hybrid core may have a compressive strength of from about 95 kPa to 150 kPa, or for example, from about 100 kPa to about 140 kPa or from about 100 kPa to about 130 kPa or from about 100 kPa to about 120 kPa.

Suitably, at least one reinforcing member has a substantially smooth outer surface. An advantage of this arrangement is that, after the vacuum is applied, the VIP has at least one smooth (outer) surface than could otherwise be achieved with a reduced density core. VIPs of the state of the art having insulating cores of below about 170 kg/m$^3$ are typically rougher or more undulating than higher density materials. Thus the VIPs of the present invention possess an aesthetic advantage over prior art reduced insulating core VIPs and furthermore their comparatively smoother surface affords the VIPs of the present invention a better contact surface for adhesion of the VIP to other surfaces in use. In certain embodiments, a pattern or logo may be imprinted or embossed on the outer surface of the reinforcing member.

Within the hybrid core, the density of the at least one reinforcing member is desirably lower than that of the insulating core. VIPs of the invention comprising a plurality of reinforcing members, for example in embodiments having an upper reinforcing member and a lower reinforcing member, the upper reinforcing member and the lower reinforcing member may each have a density that is lower than that of the insulating core. While the reinforcing member may have a density that is higher than that of the insulating core, as forming a VIP having a reduced density core is desired, preferably, the reinforcing member has a density that is lower than that of the insulating core. In other embodiments one of the reinforcing members may have a density that is higher than that of the insulating core. Optionally one reinforcing member will have a density that is higher than that of the insulating core and a second reinforcing member will have a density that is lower than that of the insulating core.

The reinforcing member is a vacuum stable porous material. The reinforcing member may be formed of a rigid porous material having an average pore size of between about 20 micron to about 200 micron. For example, the average pore size may be about 50 micron to about 200 micron, or about 50 micron to about 150 micron, or about 100 micron to about 200 micron.

Suitably, the reinforcing member may be formed from a rigid microporous material. The reinforcing member may be formed from polyurethane. The reinforcing member may be a foam. The reinforcing member may be formed from polyurethane (PU), polyisocyanurate (PIR), polyethylene (PE), polyethylene terephthalate (PET) or polyphenolic (PP) or combinations thereof. For example, the reinforcing member may be formed from polyurethane (PU), polyisocyanurate (PIR), polyethylene (PE), polyethylene terephthalate (PET) or polyphenolic (PP) foams or combinations thereof. The reinforcing member may be formed from mixed polymeric foams.

Suitably, a VIP of the invention, comprises at least one reinforcing member formed of polyurethane. A VIP of the invention may comprise an upper reinforcing member and a lower reinforcing member, wherein each reinforcing member is formed of polyurethane. Desirably a polyurethane foam is used.

In general the reinforcing member has a density of between about 30 kg/m$^3$ to 80 kg/m$^3$. The reinforcing member is a rigid microporous material. The average pore size of the porous material from which the reinforcing member is constructed is generally lower than about 150 micron in diameter. For example, the average pore size of the porous material from which the reinforcing member is constructed may be lower than about 140 micron in diameter, or lower than about 130 micron in diameter, or lower than about 120 micron in diameter or lower than about 110 micron in diameter or lower than about 100 micron in diameter. The small pore size contributes to the longevity of the VIP, notably, the smaller the pore size the longer the lifetime of the VIP. Accordingly, materials having larger pore size, are not suitable as reinforcing members in the present invention. Materials having an average pore size typically larger than about 250 micron are not suitable as reinforcing members in the present invention.

The reinforcing member may be a substantially open celled foam material. The foam may have an open cell content of greater than about 90%. (This is a based on a porosity determination measuring the accessible cellular volume. The remaining % of the volume is made up of closed cells and cell walls). For example, the reinforcing member may be a polyurethane foam with an open cell content of greater than about 90%.

The thickness of the reinforcing member and the thickness of the insulating core may be in a ratio of respectively from about 1:5 to about 1:50; suitably from about 1:5 to about 1:20. For example, the thickness of the reinforcing member to that of the HI insulating core is in a ratio of respectively from about 1:5, 1:6, 1:7, 1:8, 1:9, 1:10, 1:11, 1:12, 1:13, 1:14, 1:15, 1:16, 1:17, 1:18, 1:19 or 1:20, within the VIP. Specifically, when the thickness of the reinforcing member to that of the insulating core is in a ratio of respectively from about 1:Y is mentioned, that implies that the thickness of the insulating core is Y times the thickness of the reinforcing member.

Within a hybrid core, the reinforcing member must be sufficiently strong to support the insulating core, such that when the hybrid core is being conveyed on conveyer belts during manufacture, the integrity of the hybrid core is maintained. Hence, when the hybrid core is conveyed between two conveyer belts having a gap therebetween, said gap being less than the length and/or width of the hybrid core, the reinforcing member must be sufficiently strong to support the insulating core.

The insulating core of the VIPs of the invention, is suitably constructed substantially from a material comprising an insulating microporous material, for example a powder insulating microporous material. For example, the insulating core may be constructed from a material comprising a powder material selected from the group consisting of fumed silica, precipitated silica or perlite, or combinations thereof. The insulating core may be constructed from a material comprising fumed silica.

The insulating core may be constructed from an insulation material in particulate form. The insulating core may be constructed from microporous materials such as silica, perlite, diatomaceous earth, and especially fumed silica and combinations thereof.

The insulating material is preferably microporous insulating material with an average particle size of less than about 1 micron in diameter. In general the microporous insulating material has an average particle size of about 20 nm to about 500 nm, for example from about 50 nm to about 500 nm, or from about 50 nm to about 400 nm, or from about 50 nm to about 350 nm, or from about 50 nm to about 300 nm, or from about 100 nm to about 300 nm, or from about 100 nm to about 400 nm. Suitably, the microporous insulating material has an average particle size of less than about 200 nm.

These materials may be mixed with infra-red absorbing materials (IR opacifiers) such as carbon black, titanium dioxide, iron oxides, magnetite or silicon carbide, or combinations thereof.

Accordingly, while the insulation material of the insulating core is primarily composed of microporous materials, there may in addition be smaller percentages (typically 5-20% each) of a fibre binder (which can be polymeric or inorganic) and an infra-red opacifier (e.g. silicon carbide, carbon clack or iron oxide). Neither the fibres nor the opacifier need be microporous and generally they are not microporous.

The insulation material may be a mixture for example it may comprise fibres which serve to bind the particulate material together (once pressed). The fibres may be of organic or inorganic material. In one case the fibres are polyester or polypropylene fibres.

Suitably, the insulation core comprises powder based insulating material, for example, fumed silica, precipitated silica or perlite, or combinations thereof.

The at least one reinforcing member may comprise polyurethane and the insulating core comprises fumed silica.

The insulating cores utilised in conventional VIPs, such as those constructed from a material comprising powdered insulating material, for example fumed silica have core densities in the range of from about 170 to about 200 kg/m$^3$. The resulting thermal conductivity of conventional VIPs ranges from about 4.0 mW/mK to about 4.5 mW/mK.

A VIP of the present invention, for example wherein the insulating core comprises fumed silica, can achieve a core density of about 100 kg/m$^3$ to about 165 kg/m$^3$, for example about 110 kg/m$^3$ to about 165 kg/m$^3$, or about 110 kg/m$^3$ to about 160 kg/m$^3$, or 120 kg/m$^3$ to about 160 kg/m$^3$ or 130 kg/m$^3$ to about 160 kg/m$^3$, or about 100 kg/m$^3$ to about 140 kg/m$^3$, or about 100 kg/m$^3$ to about 135 kg/m$^3$, or about 100 kg/m$^3$ to about 120 kg/m$^3$. Hence, the incorporation of the reinforcing member into the VIP, facilitates a reduction by up to about 25% of the insulating core density in comparison to insulating cores employed in standard VIPs, which corresponds to about a 13% improvement in thermal performance of the VIP overall.

The density of the insulating core within VIPs of the present invention is of from about 110 kg/m$^3$ to about 165 kg/m$^3$. Optionally the density of the insulating core within VIPs of the present invention is of from about 130 kg/m$^3$ to about 160 kg/m$^3$. For example, the density of the insulating core within VIPs of the present invention may be from 110 kg/m$^3$ to 160 kg/m$^3$; or from 130 kg/m$^3$ to 160 kg/m$^3$; or from 128 kg/m$^3$ to 162 kg/m$^3$; or from 132 kg/m$^3$ to 157 kg/m$^3$; or from 128 kg/m$^3$ to 162 kg/m$^3$ or from 132 kg/m$^3$ to 157 kg/m$^3$, or from 100 kg/m$^3$ to 140 kg/m$^3$, or from 100 kg/m$^3$ to 135 kg/m$^3$, or from 100 kg/m$^3$ to 120 kg/m$^3$.

The insulating core may comprise fumed silica and said insulating core has a density of from about 110 kg/m$^3$ to about 160 kg/m$^3$. Optionally said insulating core may have a density of from about 130 kg/m$^3$ to about 160 kg/m$^3$.

The at least one reinforcing member may comprise polyurethane and the insulating core may comprise fumed silica and said insulating core has a density of from about 110 kg/m$^3$ to about 160 kg/m$^3$, optionally said density may be of from about 130 kg/m$^3$ to about 160 kg/m$^3$.

VIPs according to the invention have a thermal conductivity in the range of from about 3.0 mW/mK to about 4.0 mW/mK. Suitably the thermal conductivity value is less than 3.5 mW/mK.

The insulating core may be constructed from a material comprising a powder insulating microporous material selected from the group consisting of fumed silica, precipitated silica and perlite, or combinations thereof; and the at least one reinforcing member has a compressive strength of between 95 kPa and 150 kPa.

The porous insulating core is constructed from a powder material that is formed into an insulating (microporous) core for example a powder insulating microporous material selected from the group consisting of fumed silica, precipitated silica and perlite, or combinations thereof; and the at least one reinforcing member has a compressive strength of between 95 kPa and 150 kPa; wherein the reinforcing member comprises polyurethane.

The porous insulating core may comprise fumed silica and the at least one reinforcing member may comprise polyurethane.

The hybrid core may be encased in an air permeable cover prior to encasing the hybrid core in the flexible envelope.

For example, the air permeable cover may be selected from non-woven PET fleece or perforated shrink wrap.

The envelope may be metallised polyethylene terephthalate (PET) laminate or aluminium foil. Suitably, the envelope is an aluminium metallised polyester comprising a layer of polyethylene on the aluminium, for example as a laminate. When forming the VIP the layer of polyethylene is within the envelope. The polyethylene layer is employed to seal the VIP once the envelope comprising the hybrid core is evacuated. The envelope may also be metallised ethylene vinyl alcohol (EVOH), metallised polypropylene (PP), or metallised ultra low density polyethylene (ULPE)

The VIP may have a thermal conductivity in the range of from about 3.0 mW/mK to about 4.0 mW/mK; wherein the thickness of the reinforcing member and the thickness of the insulating core are in a ratio of respectively from about 1:5 to about 1:20, within the vacuum insulating panel; the at least one reinforcing member comprises polyurethane and the insulating core is constructed from a microporous insulating material comprising fumed silica and said insulating core has a density of from about 110 kg/m$^3$ to about 160 kg/m$^3$, for example from about 130 kg/m$^3$ to about 160 kg/m$^3$ within the VIP.

Advantageously, the VIPs of the present invention can be incorporated into shipping containers, pipe insulation, refrigerators, coolers, and in a variety of industrial appliances. Furthermore, the VIPs of the present invention are lightweight, more robust than traditional VIPs and can be used in a variety of environments. For example, the VIPs of the present invention can be used in cryogenic apparatus and also at elevated temperature (up to 80° C.) without jeopardising their insulating performance.

The invention provides a method of manufacture for a vacuum insulating panel, comprising:
providing a porous insulating core having an upper surface and a lower surface and sides;
arranging at least one reinforcing member on the upper or lower surface of the insulating core to reinforce the core, wherein the reinforcing member is formed of a porous material, and is substantially rigid;
wherein together the at least one reinforcing member and the insulating core form a hybrid core and the reinforcing member(s) do not form a thermal bridge across the insulating core;
enveloping the hybrid core with a barrier envelope, optionally in the form of a barrier film; and
applying a vacuum to evacuate the barrier envelope, so that the barrier envelope, closely engages the insulating core and the at least one reinforcing member(s) of the hybrid core.

The porous insulating core may be formed and pressed in a mould. The reinforcing member and the insulating core may be pressed together in a mould, to form the hybrid core.

The hybrid core may be encased in an air permeable cover; prior to encasing the hybrid core in the flexible envelope.

An advantage of this arrangement is that the reinforcing member provides rigidity to the core during the production process, thereby allowing a reduced density core to be used without introducing handling problems during production.

Arranging at least one reinforcing member on the upper or lower surface of the core may comprise arranging a reinforcing member having a substantially smooth outer surface on the upper or lower surface of the core.

Providing an insulating core may comprise providing an insulating core having a density of between about 100 kg/m$^3$ to about 165 kg/m$^3$ within the VIP. Optionally providing an insulating core may comprise providing an insulating core having a density of about 100 kg/m$^3$ to about 140 kg/m$^3$, or from about 100 kg/m$^3$ to about 120 kg/m$^3$, or from about 130 kg/m$^3$ to about 160 kg/m$^3$ within the VIP.

Arranging at least one reinforcing member on the upper or lower surface of the core may comprise arranging a reinforcing member formed from a rigid microporous material, such as polyurethane, on the upper or lower surface of the core.

Arranging at least one reinforcing member on the upper or lower surface of the core may comprise arranging an upper reinforcing member on the upper surface of the core and arranging a lower reinforcing member on the lower surface of the core.

Arranging a lower reinforcing member on the lower surface of the core may comprise:
arranging the lower reinforcing member in a mould;
filling the mould with an insulation material; and
pressing the insulation material in the mould to form the insulating core.

Arranging an upper reinforcing member on the upper surface of the core may comprise:
filling a mould with an insulation material;
arranging the upper reinforcing member on top of the insulation material in the mould; and
pressing the insulation material in the mould to form the insulating core.

Together the at least one upper or lower reinforcing member(s) and the insulating core form a hybrid core.

The present invention provides a method of manufacturing a vacuum insulating panel, comprising:
arranging a lower reinforcing member in a mould;
filling the mould with an insulation material;
pressing the insulation material on the lower reinforcing member, within the mould, to form a hybrid core, comprising the reinforcing member and an insulating core which is desirably microporous; wherein the reinforcing member is arranged so as not to form a thermal bridge across the insulating core;
enveloping the hybrid core with a barrier envelope, optionally in the form of a barrier film; and
applying a vacuum to evacuate the barrier envelope, so that the barrier envelope closely engages the insulating core and the reinforcing member of the hybrid core, within the vacuum insulating panel.

The present invention provides a method of manufacturing a vacuum insulating panel, comprising the following steps:
arranging a lower reinforcing member in a mould;
filling the mould with an insulation material;
arranging an upper reinforcing member on top of the insulation material, to form a sandwich;
pressing the sandwich thus formed, within the mould, to form a hybrid core, comprising the upper reinforcing member, an insulating core which is optionally microporous and a lower reinforcing member; wherein the reinforcing members are arranged so as not to form a thermal bridge across the insulating core;
enveloping the hybrid core with a barrier envelope, optionally in the form of a barrier film; and
applying a vacuum to evacuate the barrier envelope, so that the barrier envelope closely engages the insulating core and the reinforcing member of the hybrid core, within the vacuum insulating panel.

The insulating core formed by the method of the invention may have a density of from about 130 kg/m$^3$ to about 160 kg/m$^3$ within the VIP.

Suitably, the VIP formed by the method of the invention has a thermal conductivity value of from about 3.0 mW/mK to about 4.0 mW/mK.

Optionally the hybrid core is made in a continuous process, so that a continuous hybrid core is made and then cut to length. For example the invention provides a method of manufacturing a vacuum insulating panel, comprising:
leading a lower reinforcing member to a lay down area; wherein the reinforcing member is formed of a porous material, and is substantially rigid;

laying a powder insulation material down on the lower reinforcing member;

compressing the powder insulation material and the lower reinforcing member to form a pressed continuous hybrid insulation product, optionally in the form of a sheet, said pressed continuous hybrid insulation product, optionally in the form of a sheet, and optionally being of substantially uniform thickness;

cutting the pressed continuous hybrid insulation product to a desired size to provide a hybrid core; said hybrid core comprising the reinforcing member and an insulating microporous core formed from the compressed powder material; wherein the reinforcing member is arranged so as not to form a thermal bridge across the insulating core;

enveloping the hybrid core with a barrier envelope, optionally in the form of a barrier film; and applying a vacuum to evacuate the barrier envelope so that the barrier envelope, optionally in the form of a barrier film closely engages the insulating core and the reinforcing member of the hybrid core, within the vacuum insulating panel.

A method of manufacturing a vacuum insulating panel, may comprise the following steps:

leading a lower reinforcing member to a lay down area; wherein the reinforcing member is formed of a porous material, and substantially rigid;

laying a powder insulation material down on the lower reinforcing member;

arranging an upper reinforcing member on top of the powder insulation material, to form a sandwich;

compressing the sandwich thus formed to form a pressed continuous hybrid insulation product, optionally in the form of a sheet; said pressed continuous hybrid insulation product, optionally being of substantially uniform thickness;

cutting the pressed continuous hybrid insulation product to a desired size to provide a hybrid core; said hybrid core comprising a reinforcing member and an insulating core; wherein the reinforcing members are arranged so as not to form a thermal bridge across the insulating core;

enveloping the hybrid core with a barrier envelope, optionally in the form of a barrier film; and applying a vacuum to evacuate the barrier envelope so that the barrier envelope closely engages the insulating core and the reinforcing member of the hybrid core, within the vacuum insulating panel.

Optionally the sandwich is compressed from an initial volume of X m$^3$ to 0.9X m$^3$, i.e. optionally compression of the sandwich leads to a 10% reduction in the volume of the sandwich when compared to the initial volume of the sandwich prior to compression. The compressive strength of the hybrid core after compression of the sandwich may optionally be about 95 kPa to about 150 kPa, for example from about 100 kPa to about 120 kPa.

The method of manufacturing a vacuum insulating panel according to the invention may comprise the following steps:

arranging a lower reinforcing member in a mould;
filling the mould with an insulation material;
pressing the insulation material on the lower reinforcing member, within the mould, to form a hybrid core, comprising the reinforcing member and an insulating core which is optionally microporous; wherein the reinforcing member is arranged so as not to form a thermal bridge across the insulating core;

enveloping the hybrid core with a barrier envelope, optionally in the form of a barrier film; and applying a vacuum to evacuate the barrier envelope so that the barrier envelope closely engages the insulating core and the reinforcing member of the hybrid core, within the vacuum insulating panel;

wherein said reinforcing member is formed of polyurethane;

wherein said insulation material comprises fumed silica, precipitated silica, perlite or combinations thereof;

wherein the insulating core has a density in the range of from about 130 kg/m$^3$ to about 160 kg/m$^3$ within the vacuum insulating panel; and wherein the vacuum insulating panel has a thermal conductivity value of from about 3.0 mW/mK to about 4.0 mW/mK.

It will be appreciated that the term "filling" as used herein means filling sufficient material into the mould to allow moulding to take place. It does not require the mould to be completely filled.

Optionally pressing the insulating material on the lower reinforcing member leads to a hybrid core wherein the hybrid core has a volume which is about 90% the initial volume of the materials which were pressed to form the hybrid core. The compressive strength of the hybrid core after compression of the sandwich may optionally be about 95 kPa to about 150 kPa, for example from about 100 kPa to about 120 kPa.

The method of manufacturing a vacuum insulating panel according to the present invention may comprise the following steps:

arranging a lower reinforcing member in a mould;
filling the mould with an insulation material;
arranging an upper reinforcing member on top of the insulation material within the mould, to form a sandwich;
pressing the sandwich thus formed, within the mould, to form a hybrid core, comprising the upper reinforcing member, an insulating core which is optionally microporous, and a lower reinforcing member;
wherein the reinforcing members are arranged so as not to form a thermal bridge across the insulating core;

enveloping the hybrid core with a barrier envelope, optionally in the form of a barrier film; and applying a vacuum to evacuate the barrier envelope, so that the barrier envelope closely engages the insulating core and the reinforcing member of the hybrid core, within the vacuum insulating panel;

wherein said upper and lower reinforcing members are formed of polyurethane;

wherein said insulation material comprises fumed silica, precipitated silica, perlite or combinations thereof;

wherein the insulating core has a density in the range of from about 130 kg/m$^3$ to about 160 kg/m$^3$ within the vacuum insulating panel; and wherein the vacuum insulating panel has a thermal conductivity value of from about 3.0 mW/mK to about 4.0 mW/mK.

Suitably, the vacuum insulating panel has a thermal conductivity value of less than about 3.5 mW/mK.

Optionally the sandwich is compressed from an initial volume of X m$^3$ to 0.9X m$^3$, i.e. optionally compression of the sandwich leads to a 10% reduction in the volume of the sandwich when compared to the initial volume of the sandwich prior to compression. The compressive strength of the hybrid core after compression of the sandwich may optionally be about 95 kPa to about 150 kPa, for example from about 100 kPa to about 120 kPa.

The method of manufacturing a vacuum insulating panel, according to the present invention may comprise the following steps:

leading a lower reinforcing member to a lay down area; wherein the reinforcing member is formed of a porous material, and substantially rigid;

laying a powder insulation material down on the lower reinforcing member;

compressing the powder insulation material and the lower reinforcing member to form a pressed continuous hybrid insulation product, optionally in the form of a sheet;

said pressed continuous hybrid insulation product optionally being of substantially uniform thickness;

cutting the pressed continuous hybrid insulation product to a desired size to provide a hybrid core; said hybrid core comprising a reinforcing member and an insulating core formed from the powder insulation material;

wherein the reinforcing member is arranged so as not to form a thermal bridge across the insulating core;

enveloping the hybrid core with a barrier envelope, optionally in the form of a barrier film; and applying a vacuum to evacuate the barrier envelope so that the barrier envelope closely engages the insulating core and the reinforcing member of the hybrid core, within the vacuum insulating panel;

wherein the reinforcing member is formed of polyurethane; wherein the powder insulation material is fumed silica; wherein the insulating core has a density in the range of from about 130 kg/m$^3$ to about 160 kg/m$^3$ within the vacuum insulating panel; and wherein the vacuum insulating panel has a thermal conductivity value of from about 3.0 mW/mK to about 4.0 mW/mK. The insulating core is desirably microporous.

The method of manufacturing a vacuum insulating panel, according to the present invention may comprise the following steps:

leading a lower reinforcing member to a lay down area; wherein the reinforcing member is porous and substantially rigid;

laying powder insulation material down on the lower reinforcing member;

leading an upper reinforcing member over the powder insulation material;

compressing the sandwich thus formed to form a hybrid core; wherein within the hybrid core, the compressed powder insulation material forms an insulating core;

wherein the reinforcing members are arranged so as not to form a thermal bridge across the insulating core;

enveloping the hybrid core with a barrier envelope, optionally in the form of a barrier film; and applying a vacuum to evacuate the barrier envelope closely engages the insulating core and the reinforcing member of the hybrid core; within the vacuum insulating panel;

wherein the upper and lower reinforcing members are formed of polyurethane; wherein the powder insulation material is fumed silica; wherein the insulating core has a density in the range of from about 130 kg/m$^3$ to about 160 kg/m$^3$ within the vacuum insulating panel; and wherein the vacuum insulating panel has a thermal conductivity value of from about 3.0 mW/mK to about 4.0 mW/mK.

Typically during formation a vacuum of 0.005 kPa is applied for 30 to 270 seconds (depending on the size of the panel). Generally said vacuum is applied for approximately 90 seconds.

The pressure within the vacuum insulation panel of the invention is generally between 0.01 kPa and 0.40 kPa.

The methods of manufacture of the present invention may comprise controlling the level of moisture in the insulation material. Heat may be applied to control the level of moisture in the insulation material.

The method of manufacture, may comprise encasing the hybrid core in an air permeable cover prior to encasing the hybrid core in a flexible envelope.

The reinforcing member may have a substantially smooth outer surface on the upper or lower surface of the core.

BRIEF DESCRIPTION OF THE DRAWINGS

Embodiments of the invention will be described, by way of example only, with reference to the accompanying drawings in which:

FIG. 3 clearly shows the hybrid core sandwich formed by the upper reinforcing member the lower reinforcing member and the insulating core therebetween. The cut-away view clearly depicts how the envelope, envelops the hybrid core.

FIG. 4 clearly shows the sandwich nature of the hybrid core, and in particular shows how the reinforcing layer does not wrap around the insulating core at the sides of the VIP. Accordingly, the reinforcing member does not form a thermal bridge across the insulating core.

DETAILED DESCRIPTION OF THE DRAWINGS

Figure 1:
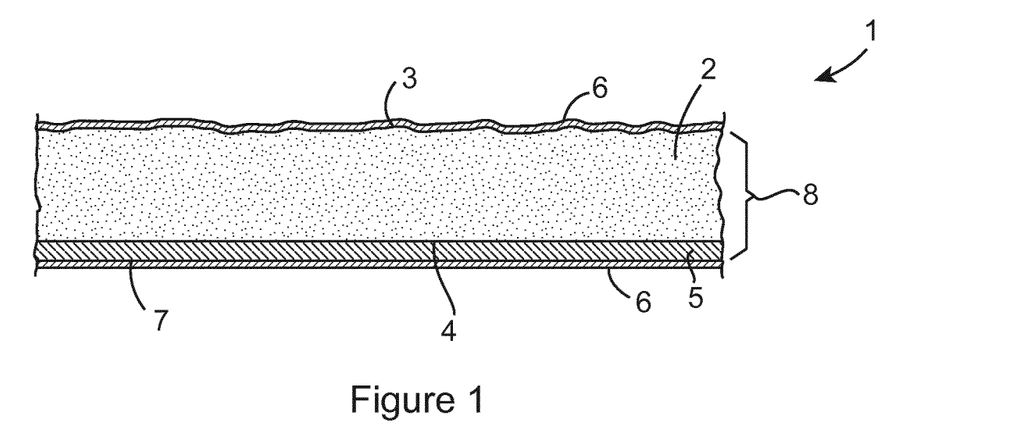
FIG. 1 is a cross-sectional view of a portion of a VIP according to a first embodiment of the invention.

The FIG. 1 illustrates a cross section portion of VIP 1 according to a first embodiment of the invention in cross-section. The VIP 1 comprises an insulating core 2 having a density of 140 kg/m$^3$ having upper 3 and lower 4 surfaces. The VIP also comprises a reinforcing member 5 of rigid polyurethane arranged on the lower surface 4 of the core 2. The reinforcing member 5 is porous and has a substantially smooth outer surface 7. Together the reinforcing member 5 and the insulating core 2 form a hybrid core 8. The reinforcing member 5 is arranges so that no thermal bridge is formed across the insulating core 2 i.e. the reinforcing member does not form a thermal bridge between upper surface 3 of the insulating core and lower surface 4 of the insulating core. The VIP further comprises a barrier envelope, optionally constructed from a barrier film 6, arranged to envelop the insulating core 2 and the reinforcing member 5 of the hybrid core 8.

The VIP 1 is manufactured by arranging a product, optionally in the form of a sheet, 5 of rigid polyurethane in a mould, filling the mould with a particulate insulation material which in the embodiment is a mixture of powder and fibres and pressing the mixture in the mould to form the insulating core 2 (which is porous and optionally microporous) having a reinforcing member 5 arranged on the lower surface 4 thereof. The insulating core 2 and the reinforcing member 5 together form a hybrid core 8; wherein the reinforcing member is arranged so that no thermal bridge is formed across the insulating core 2 i.e. the reinforcing member does not form a thermal bridge between upper surface 3 of the insulating core and lower surface 4 of the insulating core. The hybrid core 8 is then enveloped with the barrier film 6 and a vacuum is applied so that the barrier film closely engages the insulating core and the polyurethane layer 5 of the hybrid core 8. As shown in FIG. 1, when the vacuum is applied, the upper surface of the VIP is relatively rough, due to the undulating surface of the low density insulating core 2, whereas the lower surface of the VIP is relatively smooth, due to the smooth outer surface of the polyurethane sheet or reinforcing member 5.

Figure 2:
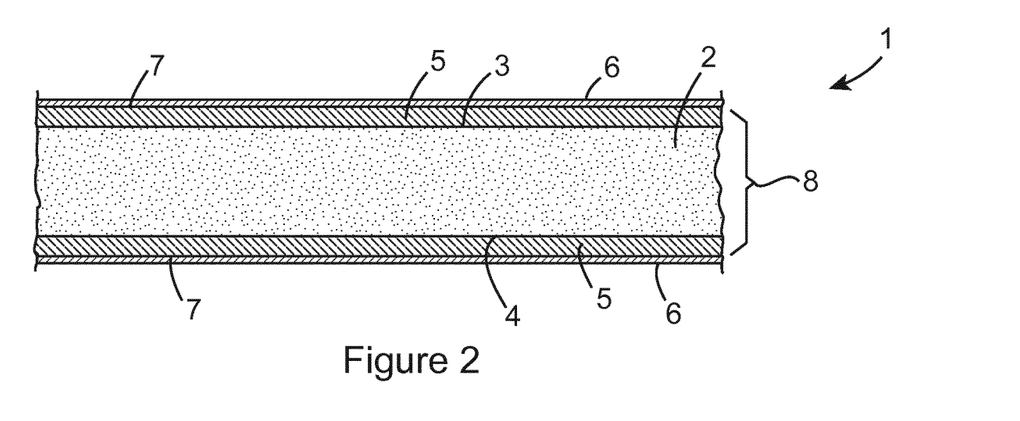
FIG. 2 is a cross-sectional view of a portion of a VIP according to a second embodiment of the invention.

FIG. 2 illustrates a portion of VIP 1 according to a second embodiment of the invention in cross-section. The VIP 1 comprises an insulating core 2 having a density of 130 kg/m$^3$ having upper 3 and lower 4 surfaces. The VIP also comprises two reinforcing members 5 of rigid polyurethane arranged on the upper 3 and lower 4 surfaces of the core 2. The reinforcing members 5 are arranged so as not to form a thermal bridge across the insulating core 2 i.e. the reinforcing members do not form a thermal bridge between upper surface 3 of the insulating core and lower surface 4 of the insulating core. The layers 5 are porous and each has substantially smooth outer surface 7. The VIP further comprises a barrier film 6, arranged to envelop the insulating core 2 and the reinforcing members 5 of the hybrid core 8.

The dimensions of the VIP in FIG. 1 are 300 mm×300 mm×30 mm.

In the exemplified embodiments, the reinforcing member 5 is a sheet of polyurethane foam, having a thickness of 1 to 5 mm, for example the thickness may be 1.0 mm, 1.5 mm, 2.0 mm, 2.5 mm, 3.0 mm, 3.5 mm, 4.0 mm, 5.0 mm. The reinforcing member may have a density of 30-80 kg/m$^3$, and an open cell content of about 90%. The polyurethane foam reinforcing member has a compressive strength of 95-150 kPa.

The insulating core is constructed from an insulation material mixture comprising fumed silica (50-90% w/w), opacifier (5-40% w/w), and fibres (0-20% w/w). The density of the insulating core within the VIP of FIG. 1 is 140 kg/m$^3$, whereas the density of the insulating core within the VIP of FIG. 2 is 130 kg/m$^3$.

The initial thermal conductivity of the VIP in FIG. 1 is 3.4 mW/mK, whereas the initial thermal conductivity of the VIP in FIG. 2 is 3.6 mW/mK.

The thickness of the reinforcing member in the VIP of FIG. 1 is approximately 2 mm and the insulating core in the VIP of FIG. 1 is approximately 2 mm. The thickness of reinforcing member in the VIP of FIG. 2 is approximately 2 mm and the thickness of the insulating core in the VIP of FIG. 2 is approximately 26 mm.

The vacuum pressure within the VIPs of the invention is between 0.01 kPa (0.1 mBar) and 0.40 kPa (4 mBar).

Figure 4:
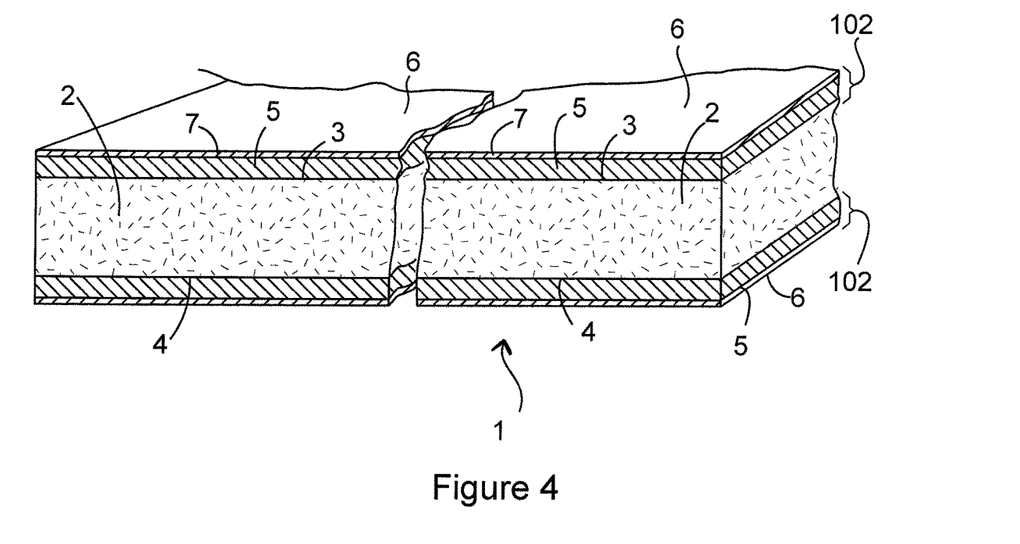
FIG. 4 is a cross section view of a VIP according to the invention, which also shows the structure of the hybrid core at the sides of the VIP.
Figure 5:
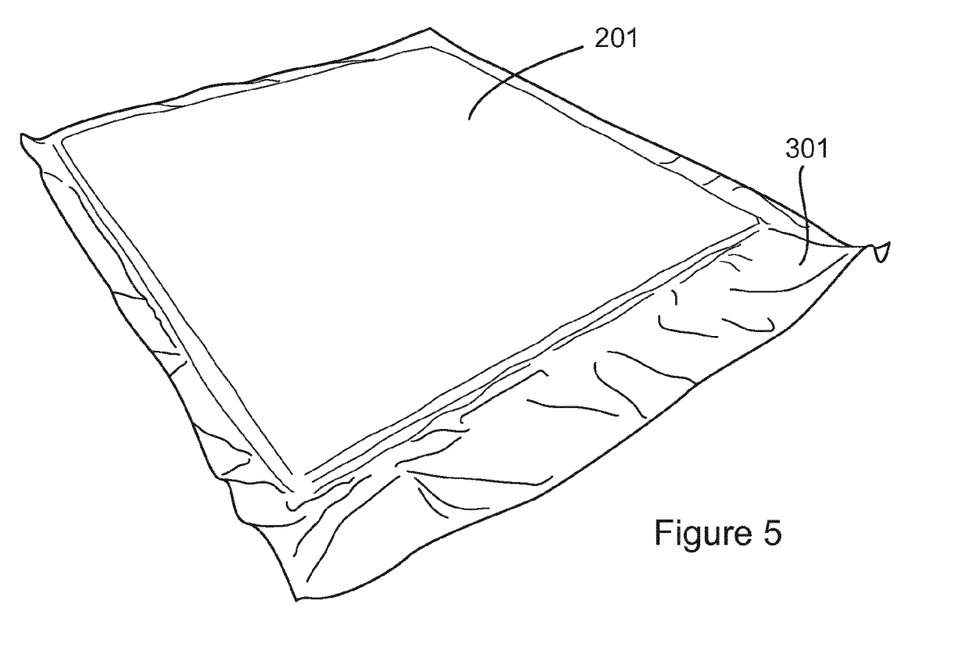
FIG. 5 shows a perspective view of a VIP according to the invention after the application of the vacuum and sealing of the envelope, prior to trimming and folding of the edges to form the finished product. The smooth exterior of the VIP is clearly shown.

The hybrid cores of the VIPs of the present invention may be enveloped with a barrier envelope, optionally in the form of a barrier film, as described in GB2492876 and as shown in FIGS. 4 and 5 therein.

Figure 3:
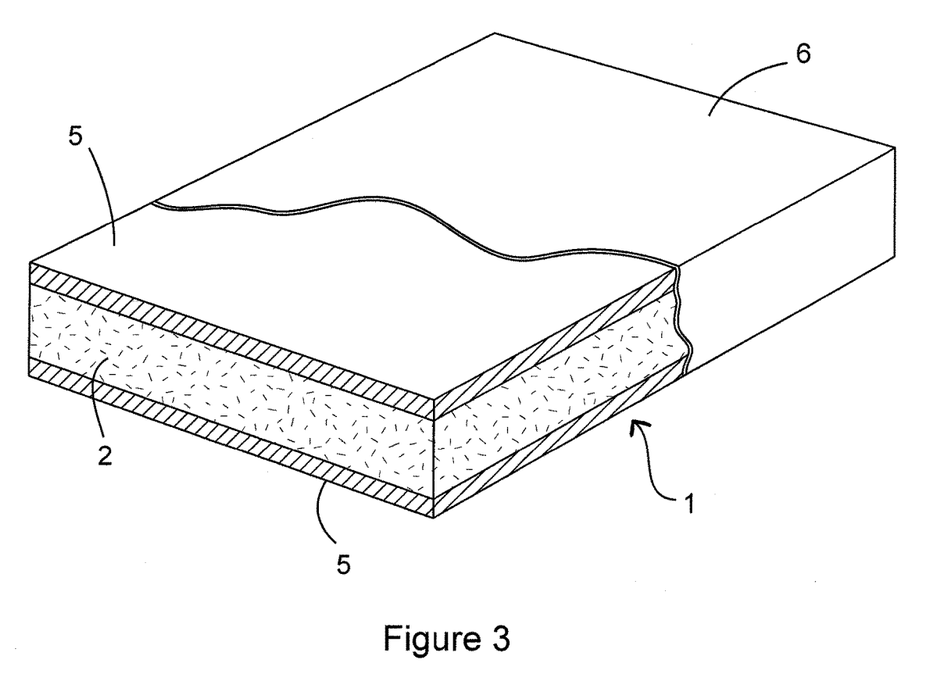
FIG. 3 is a perspective cut-away view of a VIP according to the invention.

FIG. 3 is a perspective cut-away view of a VIP 1 according to the invention. The VIP shown in FIG. 3 comprises both an upper reinforcing member 5 and a lower reinforcing member 5 and has the same construction as the VIP shown in FIG. 2. FIG. 3 clearly shows the hybrid core sandwich formed by the upper reinforcing member 5 the lower reinforcing member 5 and the insulating core 2 therebetween. The cut-away view clearly depicts how the barrier film (or envelope) 6, envelops the hybrid core.

FIG. 4 is a cross section view of a VIP 1 according to the invention, which also shows the structure of the hybrid core at the sides of the VIP. The VIP 1 comprises an insulating core 2 having a density of 130 kg/m$^3$ having upper 3 and lower 4 surfaces. The VIP also comprises two reinforcing members 5 of rigid polyurethane arranged on the upper 3 and lower 4 surfaces of the core 2. The reinforcing members 5 are arranged so as not to form a thermal bridge across the insulating core 2 i.e. the reinforcing members do not form a thermal bridge between upper surface 3 of the insulating core and lower surface 4 of the insulating core. The layers 5 are porous and each has substantially smooth outer surface 7. The VIP further comprises a barrier film 6, arranged to envelop the insulating core 2 and the reinforcing members 5 of the hybrid core 8. FIG. 4 clearly shows the sandwich nature of the hybrid core, in particular 102 shows how the reinforcing layer does not wrap around the insulating core at the sides of the VIP. Accordingly, the reinforcing member 5 does not form a thermal bridge across the insulating core 2.

FIG. 5 shows a perspective view of a VIP 201 according to the invention after the application of the vacuum and sealing of the barrier film (or envelope), prior to trimming and folding of the edges to form the finished product. The smooth exterior of the VIP is clearly shown. This smooth surface affords the VIPs of the present invention a better contact surface for adhesion of the VIP to other surfaces in use. The VIP shown in FIG. 5 may have the same construction as the VIP of FIG. 1 or the VIP of FIG. 2.

Figure 6:
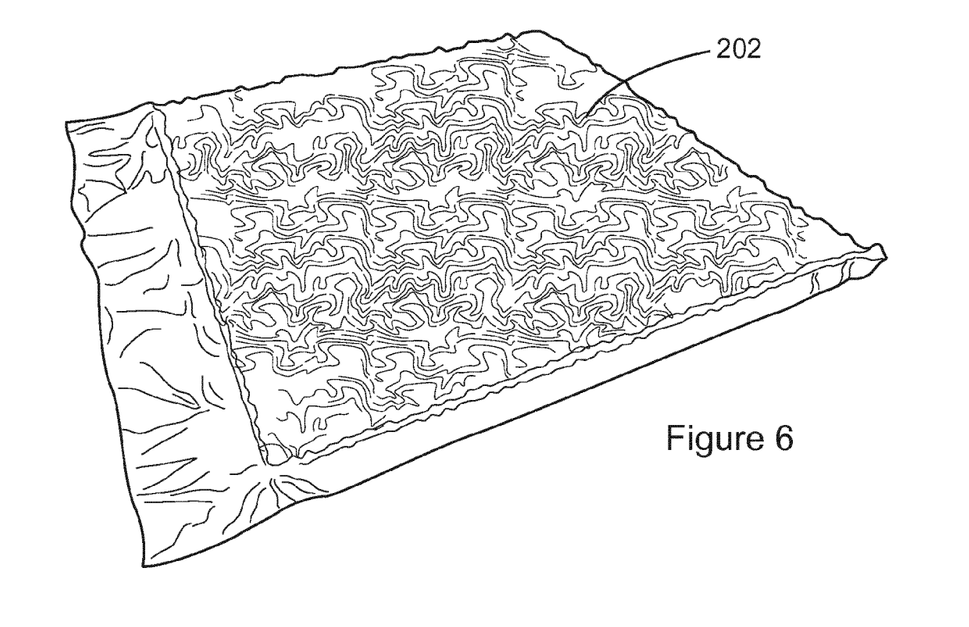
FIG. 6 shows a perspective view of a VIP having a reduced density core, but absent the reinforcing members of the present invention. The surface of the VIP is wrinkled and the edges are collapsing.

FIG. 6 shows a perspective view of a VIP 202 having a reduced density core, but absent the reinforcing members of the present invention. The surface of the VIP is wrinkled and the edges are collapsing. VIP 202 is not commercially acceptable. Because of the collapsing surfaces and edges, the VIP does not pack well.

Figure 7:
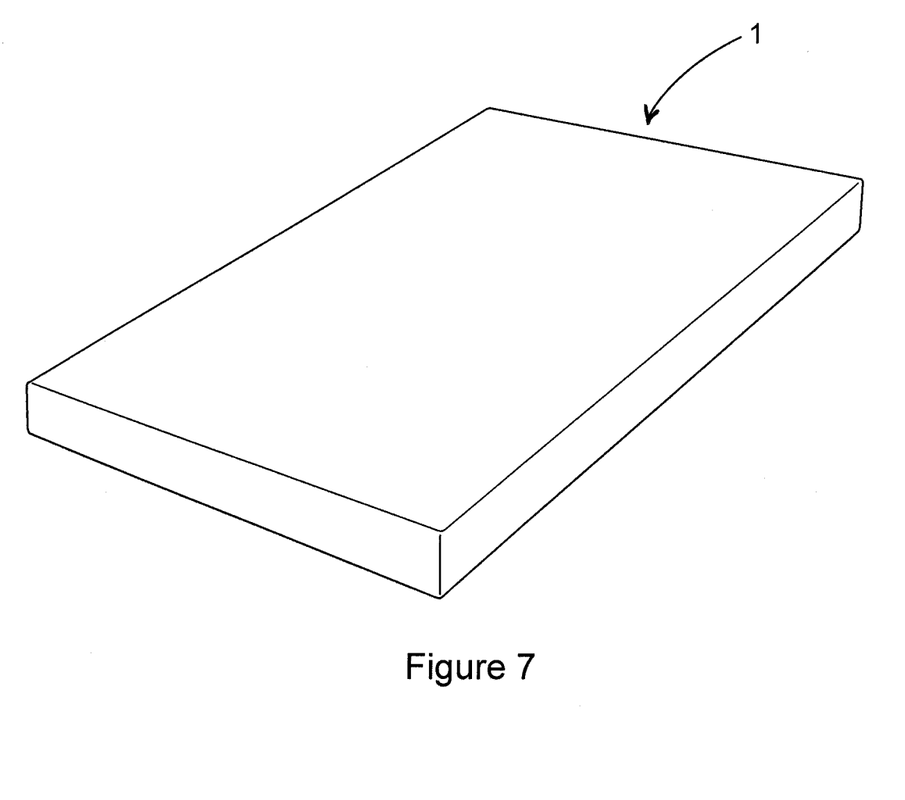
FIG. 7 shows a perspective view of the finished VIP according to the invention.

FIG. 7 shows a perspective view of the finished VIP according to the invention.

Figure 8:
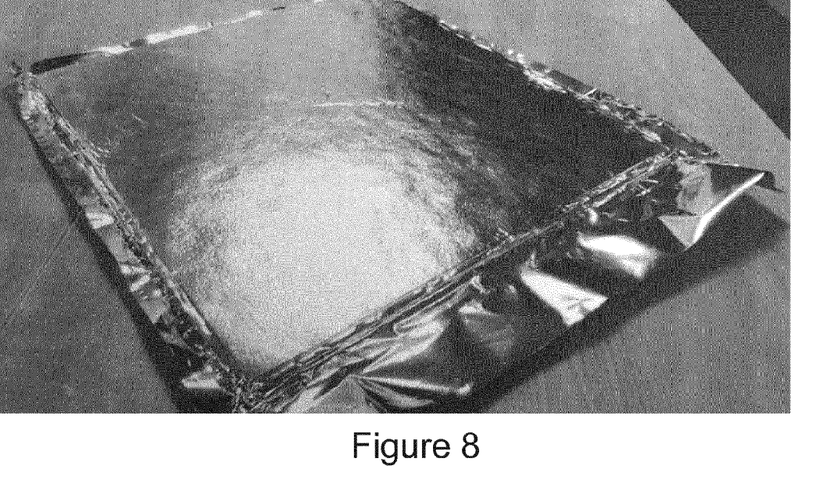
FIG. 8 is a photograph of a VIP according to the invention as described in relation to FIG. 5 above. The smooth surface of the VIP is clearly shown.

FIG. 8 is a photograph of a VIP according to the invention as described in relation to FIG. 5 above. The smooth surface of the VIP is clearly shown.

Figure 9:
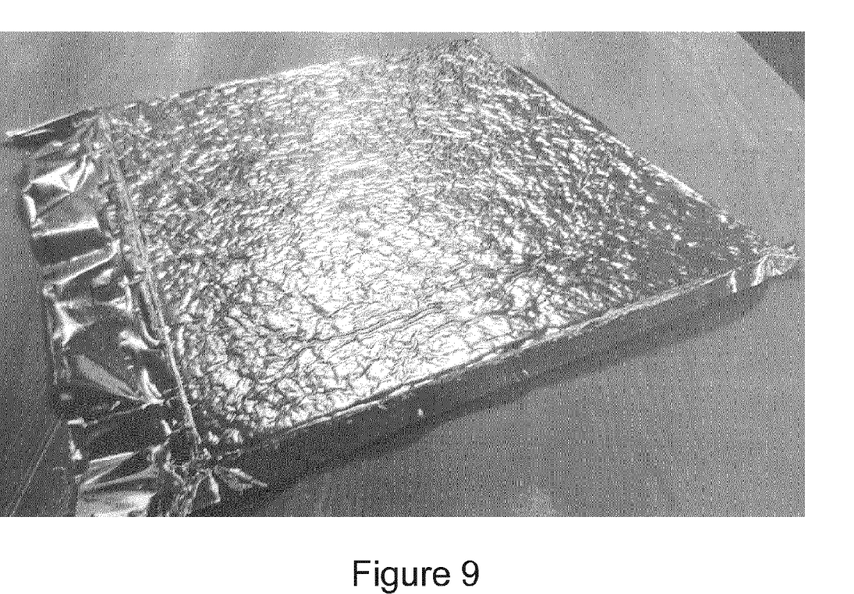
FIG. 9 is a photograph of a reduced density core VIP but absent reinforcing members, as described in relation to FIG. 6 above. The wrinkled and collapsing surface of the VIP is clearly shown.

FIG. 9 is a photograph of a reduced density core VIP but absent reinforcing members, as described in relation to FIG. 6 above. The wrinkled and collapsing surface of the VIP is clearly shown. VIPs having a wrinkled collapsing surface are commercially unacceptable. In addition, as a result of the wrinkling they do not pack well.

As outlined above, the hybrid core may be encased in a in an air permeable cover prior to encasing the hybrid core in the flexible envelope. For example, the air permeable cover may be selected from a non-woven PET fleece or perforated shrink wrap.

The words "comprises/comprising" and the words "having/including" when used herein with reference to the present invention are used to specify the presence of stated features, integers, steps or components but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The invention claimed is:

1. A vacuum insulating panel comprising:
    a porous insulating core having an upper surface and a lower surface and sides, the insulating core is constructed from a microporous insulating material formed from a powder material;
    at least one reinforcing member arranged on the upper or lower surface of the insulating core to reinforce the core, the reinforcing member is formed of a porous material, and is substantially rigid;
    the at least one reinforcing member and the insulating core form a hybrid core and the at least one reinforcing member does not form a thermal bridge across the insulating core;
    an envelope, arranged to envelop the hybrid core, the envelope maintains an applied vacuum within the envelope;
    density of the insulating core within the vacuum insulating panel is from 100 kg/m$^3$ to 160 kg/m$^3$; and
    thermal conductivity of the vacuum insulating panel is in the range of from 3.0 mW/m·K to 4.0 mW/m·K.

2. The vacuum insulating panel according to claim 1, having an upper reinforcing member arranged on the upper surface of the insulating core and a lower reinforcing member arranged on the lower surface of the insulating core.

3. The vacuum insulating panel according to claim 2, wherein the upper reinforcing member and the lower reinforcing member each have a density that is lower than that of the insulating core.

4. The vacuum insulating panel according to claim 1, wherein the at least one reinforcing member has a compressive strength of between 95 kPa and 150 kPa.

5. The vacuum insulating panel according to claim 1, wherein the hybrid core has a compressive strength of between 95 kPa and 150 kPa.

6. The vacuum insulating panel according to claim 1, wherein the density of the at least one reinforcing member is lower than that of the insulating core.

7. The vacuum insulating panel according to claim 1, wherein the at least one reinforcing member is formed of polyurethane.

8. The vacuum insulating panel according to claim 1, wherein the powder material is selected from the group consisting of fumed silica, precipitated silica or perlite, or combinations thereof.

9. The vacuum insulating panel according to claim 1 wherein the insulating core has an average pore size of from 50 nm to 350 nm.

10. The vacuum insulating panel according to claim 1, wherein the insulating core is constructed from a material comprising fumed silica and wherein the density of the said insulating core within the vacuum insulating panel is of from 130 kg/m$^3$ to 160 kg/m$^3$ or from 100 kg/m$^3$ to 130 kg/m$^3$.

11. The vacuum insulating panel according to claim 1, wherein the at least one reinforcing member is formed of a porous material having an average pore size of from 20 micron to 200 micron in diameter.

12. The vacuum insulating panel according to claim 1, wherein the thickness of the reinforcing member and the thickness of the insulating core are in a ratio of, respectively, from 1:5 to 1:20, within the vacuum insulating panel; the at least one reinforcing member comprises polyurethane and the insulating core comprises fumed silica and wherein the density of the said insulating core within the vacuum insulating panel is of from 100 kg/m$^3$ to 135 kg/m$^3$ or from 130 kg/m$^3$ to 160 kg/m$^3$.

13. The vacuum insulating panel according to claim 1, with a thermal conductivity value of less than 3.5 mW/mK.

14. A method for manufacturing a vacuum insulating panel, comprising:
    providing a porous insulating core having an upper surface and a lower surface and sides, the insulating core is constructed from a microporous insulating material formed from a powder material;
    arranging at least one reinforcing member on the upper or lower surface of the insulating core to reinforce the core, the reinforcing member is formed of a porous material, and is substantially rigid;
    the at least one reinforcing member and the insulating core form a hybrid core and the at least one reinforcing member does not form a thermal bridge across the insulating core;
    enveloping the hybrid core with a barrier envelope;
    applying a vacuum to evacuate the barrier envelope, so that the barrier envelope closely engages the insulating core and the at least one reinforcing member of the hybrid core;
    the density of the insulating core within the vacuum insulating panel is of from 100 kg/m$^3$ to 160 kg/m$^3$, and thermal conductivity of the vacuum insulating panel is in the range of from 3.0 mW/m·K to 4.0 mW/m·K.

15. The method according to claim 14, wherein an upper reinforcing member is arranged on the upper surface of the insulating core and a lower reinforcing member is arranged on the lower surface on the insulating core.

16. The method according to claim 14, wherein the at least one reinforcing member is formed of polyurethane.

17. The method according to claim 14, wherein the powder material is selected from the group consisting of fumed silica, precipitated silica or perlite, or combinations thereof.

18. The method according to claim 17, wherein the insulating core is constructed from a material comprising fumed silica and the density of the said insulating core within the vacuum insulating panel is of from 100 kg/m$^3$ to 135 kg/m$^3$ or from 130 kg/m$^3$ to 160 kg/m$^3$.

19. The method according to claim 17, wherein the insulating core is constructed from a material comprising fumed silica and the density of the said insulating core within the vacuum insulating panel is of from 100 kg/m$^3$ to 135 kg/m$^3$.

20. The method according to claim 17, wherein the insulating core is constructed from a material comprising fumed silica and the density of the said insulating core within the vacuum insulating panel is of from 130 kg/m$^3$ to 160 kg/m$^3$.

21. The method according to claim 14, wherein arranging a lower reinforcing member on the lower surface of the core comprises:
    arranging the lower reinforcing member in a mold;
    filling the mold with an insulation material; and
    pressing the insulation material in the mold to form the insulating core.

22. The method according to claim 14, wherein arranging an upper reinforcing member on the upper surface of the core comprises:

filling a mold with an insulation material;
arranging the upper reinforcing member on top of the insulation material in the mold; and
pressing the insulation material in the mold to form the insulating core.

* * * * *

UNITED STATES PATENT AND TRADEMARK OFFICE
CERTIFICATE OF CORRECTION

PATENT NO.        : 10,173,354 B2
APPLICATION NO.   : 15/543396
DATED             : January 8, 2019
INVENTOR(S)       : Daniel Mack et al.

Page 1 of 1

It is certified that error appears in the above-identified patent and that said Letters Patent is hereby corrected as shown below:

In the Specification

<u>Column 5</u>
Line 34           Before "and", delete "HI".

<u>Column 6</u>
Line 63           Before "insulating", delete "HI".

Signed and Sealed this
Ninth Day of April, 2019

Andrei Iancu
*Director of the United States Patent and Trademark Office*